Figure 1:
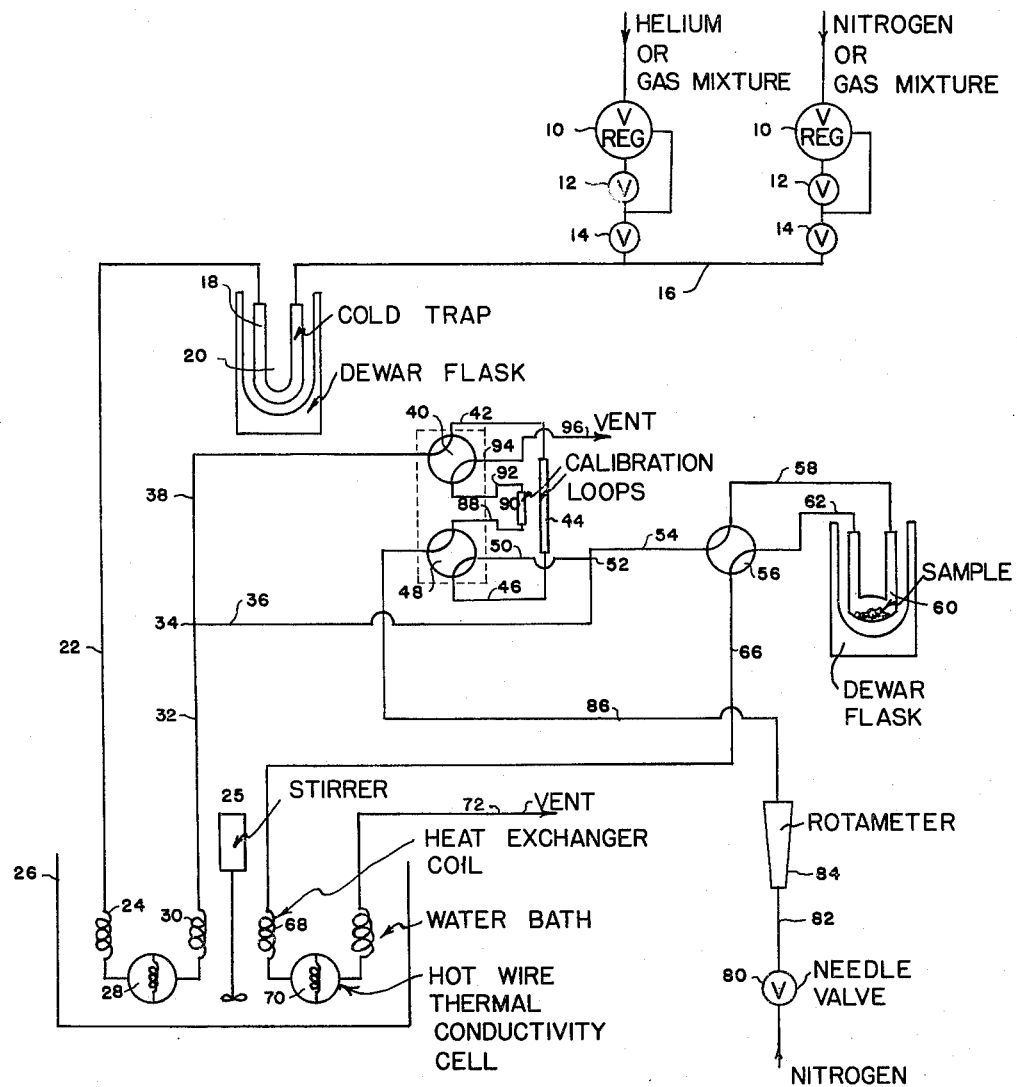

United States Patent Office 3,211,007
Patented Oct. 12, 1965

3,211,007
MEASUREMENT OF SURFACE AREAS
OF SOLIDS
Jaspard H. Atkins, Westwood, Mass., assignor to Cabot
Corporation, Boston, Mass., a corporation of Delaware
Filed Mar. 29, 1963, Ser. No. 270,137
11 Claims. (Cl. 73—432)

This invention relates to improvements in methods and apparatus especially useful for rapidly determining the surface area of solids. More precisely, the invention disclosed herein relates to improvements of existing surface area measurement methods and apparatus which improvements greatly increase the overall efficiency and the precision thereof.

In U.S. Patent No. 2,960,870 to Nelsen and Eggertsen there is disclosed a method and apparatus for rapidly determining the surface areas of solids. In accordance with the method disclosed therein, surface area measurements based on adsorption of a gas such as nitrogen may be obtained much faster than in accordance with the original B.E.T. method. The B.E.T. method, so called because the method was developed by S. Brunauer, P. H. Emmett and E. Teller, has long been recognized as the standard method of determining surface areas of solids. This method is described in detail in "Journal of American Chemical Society 60, 309 (1938)." The original basic method, however, is quite complicated and involved requiring complicated vacuum equipment and a highly skilled operator. Accordingly, the basic B.E.T. method is not one which is routinely used in industry as a simple quality control technique.

In contrast to the basic B.E.T. method, the method of Nelsen and Eggertsen is much simpler and may be carried out by relatively unskilled operators in a rather routine manner. In accordance with the method disclosed by Nelsen and Eggertsen, surface areas are obtained essentially by passing a uniform stream of a gaseous mixture containing definite, well-mixed proportions of an adsorbate and an inert diluent through a known amount of a devolatized or degassed sample of the solid on a once through basis. The temperature at which the mixture initially contacts the sample is a temperature at which even the adsorbate is not adsorbed to any appreciable extent by the sample. The mixture upon passing through the sample, is then conveyed continually through an analyzing device, usually a thermal conductivity cell, which is connected to a recording instrument. In this manner an operator by referring to the recorder and the line continually scribed by the recorder pen is able to ascertain when equilibrium conditions are established within the system. After equilibrium has been established, the temperature of the sample is reduced to one at which the adsorbate is selectively adsorbed by the sample. The amount of adsorbate removed from the mixture is recorded in diagrammatical fashion by the recorder, generally in the form of a "blip" or "peak" representing differential analysis of the gas before and after passing through the sample. When the recorder indicates that adsorption is complete, the temperature of the sample is increased to one at which the adsorbate is expelled from the sample and the amount of adsorbate removed is recorded in the form of another similar "blip" or "peak" in the differential analysis curve which is opposite in direction but substantially equal in magnitude to the adsorption "peak."

According to Nelsen and Eggertsen's preferred method, the surface area of a given solid is determined by comparing the size of its desorption "peak"—which is generally regarded as more reliable—with that of the corresponding desorption peak obtained for a similar material of known surface area. Since the flow of the mixtures of gases involved will be seriously affected by any temperature changes, precise measurements are obtained in accordance with this technique only by running a known sample each time an unknown is run. Obviously, this procedure is time consuming since the known sample is subjected to the same sequences, e.g. degassing, adsorption and desorption, as the unknown.

However, Nelsen and Eggertsen also mention an alternative but less preferred method involving the comparison of the desorption "peak" of the sample directly with the differential analysis reading produced by injection of a known additional quantity of adsorbate into the same test gas mixture in the absence of any sample. In this procedure, the apparatus is provided with a calibration loop of known volume from which the known quantity of pure adsorbate can be introduced into the test mixture and the resulting enriched mixture then conveyed to the conductivity cell. This latter method is obviously much faster than the method preferred by Nelsen and Eggertsen, but, to date, has not gained much acceptance since the accuracy thereof has left much to be desired.

I have discovered that the shape of the calibration peak obtained by injecting a known amount of adsorbate into the test gas is a much more critical factor in determining the accuracy of surface area measurements made by this second, less preferred technique of Nelsen and Eggertsen than has previously been realized. Furthermore, I have discovered that when said calibration peak is obtained in accordance with this invention, as is described in more detail hereinafter, the precision and overall efficiency of this said second and more rapid technique is greatly increased. Accordingly, the great advantages of my invention will be obvious to those skilled in the art, since it permits the practical use of the more rapid technique without loss of precision and reliability of results. Also, in accordance with preferred embodiments of my invention, the number of samples evaluated can be greatly increased and in some cases, almost doubled. Since present apparatus for conducting such surface area measurements is rather expensive costing on the order of three or four thousand dollars per set, any method whereby the overall efficiency and especially the precision thereof may be improved represents a notable contribution to the art.

The principal object of the present invention is to provide an improved method of rapidly determining surface areas of solids in a highly efficient and highly precise fashion.

Another object of the present invention is to provide improved apparatus for determining the surface areas of a wide variety of solids with a degree of precision which has not been heretofore obtained in apparatus equally convenient to use.

Other objects and advantages of the present invention will in part appear hereinafter and will in part be obvious to those skilled in the art.

The above objects and advantages are obtained in accordance with the practice of the present invention by positioning the calibration loop in a particular relationship with the sample cell and conducting the mixture of gas injected therein to the detector portion of the thermal conductivity cell via a specific route. More precisely, the improvements realized in accordance with one aspect of my invention are obtained by positioning the calibration loop directly before but substantially adjacent to the sample container and, after obtaining adsorption and desorption peaks for the given sample, injecting a known incremental quantity of adsorbate into the original gas mixture from said calibration loop. Accordingly, in my method and apparatus, the known amount of adsorbate gas is introduced to the test gas to form the calibration gas mixture at a point prior to the sample cell so that said calibration mixture flows through the sample before entering the detector portion of the thermal conductivity cell. During the passage of the calibration gas through the sample tube, the temperature of the sample is maintained at a level at which no appreciable adsorption of the adsorbate by the sample can occur.

In accordance with the above-mentioned aspect of my invention, I am able to obtain a surprisingly superior degree of precision and reliability in measurements of the surface area of solids. The degree of precision obtained obviously enhances the Nelsen and Eggertsen method as a quality control technique since relative surface area measurements may be obtained by a more reliable and precise one point determination. For example, I have found that a series of surface area measurements involving 10 to 20 samples of a given material and conducted in accordance with the teachings of my invention reveal that the percent deviation is surprisingly low and considerably lower than that obtained by present apparatus which does not utilize my method.

Also, the degree of precision greatly improves the accuracy of absolute surface areas of solids determined by the method of Nelsen and Eggertsen. For example, in order to obtain an absolute surface area for a given solid, at least two measurements are required. The points obtained by these measurements correspond to the amounts of adsorbate adsorbed by the sample at two different partial pressures of adsorbate involved. An intercept may be obtained by plotting these measurements against the partial pressures of adsorbate, and this intercept is then inserted into the B.E.T. equation and the absolute surface area calculated. As will be shown later, absolute determinations of surface areas obtained in accordance with my invention are in very close agreement with the determinations made by the classical B.E.T method.

A preferred embodiment of my invention involves an integrated arrangement of interchangeable sample cells and an auxiliary carrier gas stream for use in degassing samples, all of which will be explained in more detail hereinafter. In accordance with this aspect of my invention one sample may be outgassed while the surface area of another is being measured. Outgassing is generally required for each sample measured and normally from about 6 to 8 minutes or somewhat longer times are involved in this step in order to remove all volatile matter from the surface of the sample. Accordingly, my preferred arrangement of apparatus will increase the daily output of an operator and increase the overall efficiency of present surface area measurements apparatus.

Figure 2:
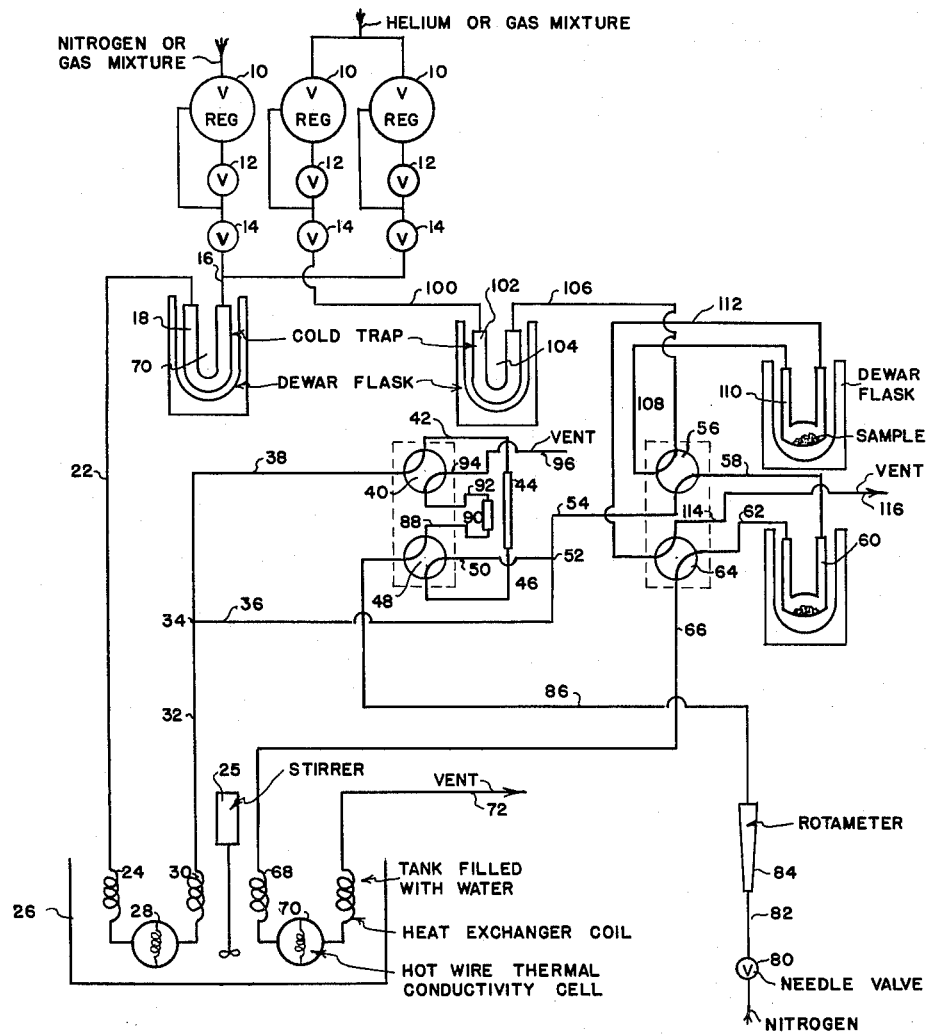

My invention will be better understood with reference to the attached drawings of which FIGURE 1 is a schematic drawing of an arrangement of apparatus suitable for carrying out surface area measurement in accordance with my method. FIGURE 2 is a schematic drawing of a preferred arrangement of apparatus which permits degassing of one sample while the adsorption and desorption peaks are being obtained on another.

Referring now to FIGURE 1, helium, which usually serves as the inert diluent in the gas mixture, and nitrogen, which is generally the adsorbate, flow continually, during the steps involved, to the system each through flow control devices consisting of a constant differential pressure regulator 10 and a flow control valve 12. The continual flow control devices which I prefer offer many advantages over those presently utilized in such apparatus. For example, in present surface area measurement apparatus, flow control is achieved by variable pressure control through fixed capillaries. The devices presently utilized, like most accurate pressure controllers presently available, have continuous gas bleeds, and cylinders of gas usually last no more than about two weeks. The pressure controller 10 in my apparatus, however, does not have a bleed but is set for only a single pressure with flow control adjustment being made by valve 12 which is usually a finely adjustable needle valve. The degree of control is substantially the same for both methods but a cylinder of gas in my apparatus will last for three to four months. This is an appreciable saving especially when analyzed, pre-mixed gases of high purity are utilized. If the gas is pre-mixed, then obviously only one flow control device is required and the one not in use may be isolated from the system by closing the appropriate shut-off valve 14.

Thus, the gases form a common stream of known composition in line 16. The stream is then continually dried by passing it through a glass wool packed U-tube 18 which is immersed in liquid nitrogen 20. From the U-tube, the stream then passes through line 22 and is warmed to ambient temperatures by passing it through a long ⅛" copper tube coil heat exchanger 24 submerged in a large water bath 26 equipped with a stirrer 25. An indication of the relative thermal conductivity of the mixture is then obtained by passing same through the reference side 28 of the conductivity cell with the signal being transmitted to a strip chart recorder (not shown). Thermal conductivity detectors are very sensitive to ambient temperature variations, and I have found it necessary for precise measurements to control carefully the temperature of both sides of the thermal conductivity cells, i.e. 28 and 70, as well as the gas which flows through them. Accordingly, I strongly prefer to mount the cells and the ⅛" copper heat exchange coils in a large heat sink or water bath 26 which is vigorously stirred.

After passing through the reference side 28 of the conductivity cell, the mixture passes through another copper tube heat exchanger 30. After leaving the heat exchanger 30, the mixture passes into line 32. At T 34 the mixture is directed to lines 36 and 38. Line 38 directs the mixture to one half of a double four way valve 40—preferably a gas chromotography double four way (stacked) valve—and, during the degassing and adsorption and desorption periods involved, line 38 communicates with line 42. From line 42 the mixture passes into a chamber 44 and from there the mixture passes through line 46 to the other half of the double four way valve 48. The volume of line 42, chamber 44 and line 46 is known and may be used as one of the calibration loops which perform a function in the measurement which will be explained in more detail hereinafter. Valve 48 is positioned so that line 46 communicates with line 50 and the mixture proceeds therethrough until at T 52 the mixture reunites with that portion of the mixture directed through line 36. The reunited mixture then passes through line 54 to by-pass valve 56 which is positioned so that line 54 communicates with line 58. From line 58 the mixture flows through sample tube 60—usually removable—which contains a known amount of the sample being measured. Upon leaving sample tube 60 the mixture passes into line 62 through by-pass valve 56 into line 66. Line 66 conveys the mixture by way of heat-exchanger 68 to the second side 70 of the thermal conductivity cell and from here the mixture usually is conveyed to the atmosphere via vent 72.

It is to be understood that during the time while the mixture is continually flowing through the apparatus in the above-described manner, the temperature of the sample in tube 60 can be changed as desired, in accordance with the method disclosed by Nelsen and Eggertsen. Accordingly, the conductivity cells 28 and 70 will be continually measuring and comparing the thermal conductivity of the mixtures passing therethrough with any differences between the two being continually recorded diagrammatically by the recorder not shown.

The reference cell 28 and the detector cell 70, which together comprise the conductivity cell, contain matched wires which are heated by passing a stabilized D.C. current through them. The temperature to which each is heated is dependent upon the thermal conductivity of the gas flowing past them. Accordingly, the differential temperature is measured by measuring and comparing the resistance of the reference and detector cells such as by wiring them as opposing arms in a Wheatstone bridge circuit so that a change in one of the resistance in relation to the other causes bridge unbalance. With constant current flowing through the bridge, any unbalance results in a difference in electrical potential which can be measured with a strip chart recorder. During the adsorption and desorption of the nitrogen, the thermal conductivity of the gas mixture will change and cause changes in resistance of the detector cell 70 hence causing bridge unbalance. This unbalance will show up as a peak on the recorder which is indicative of the amount of nitrogen adsorbed and/or desorbed by the sample.

Since the areas under the peaks obtained are proportional to the amount of nitrogen involved, a quantitative calibration between these is needed. This calibration is best achieved in accordance with my invention by introducing a known amount of pure nitrogen to the system in such a way that the shape and size of the peak corresponds closely to those of the unknown sample. A surprising improvement in precision and accuracy of results can thus be obtained.

Accordingly, referring again to FIGURE 1 after the desorption peak has been obtained, nitrogen is introduced to line 82 through needle valve 80, through rotameter 84 to line 86. Line 86 conveys the pure adsorbate to the half of the double four way valve 48 which connects line 86 with line 88. From line 88, the adsorbate flows into a chamber 90 generally of different size than chamber 44. Since it is usually desirable to purge the calibration system with pure adsorbate, line 92 conveys the adsorbate from chamber 90 to line 94 via double four way valve 40 to vent 96. After purging the system for about one minute, valves 40 and 48 are closed. The calibration system consists of line 88, chamber 90 and line 92 and, like that portion of the apparatus consisting of line 42, chamber 44 and line 46, also is of a known volume. The adsorbate is held in the calibration system for about one minute in order to permit it to equilibrate to room temperature and barometric pressure. During this time the test gas mixture continuously flows through the remainder of the system as described before with the temperature of the sample being maintained at one at which no appreciable adsorption of the adsorbate occurs. After about one minute, valves 40 and 48 are adjusted so that line 38 communicates with line 92 and line 88 with line 50, thereby forcing the known amount of adsorbate to the detector cell 70 via lines 54, 58, sample tube 60 and lines 62 and 66.

It is to be understood that if a larger volume of adsorbate were desired or required to be introduced to the detector cell 70, the adsorbate could be introduced to the calibrated volume consisting of line 42, chamber 44 and line 46. In this case the half of the double four way valve 40 would shut off the flow of mixture to line 42 from line 38. The half of the double four way valve 48 would direct the adsorbate in line 86 to line 46 and, from there, the adsorbate would flow through chamber 44 to line 42 and double four way valve 40 would direct line 42 to line 94. After purging and allowing time for equilibration, the known volume of adsorbate would be directed to line 50 by the half of the double four way valve 48 with the mixture from line 46 again being directed to line 42 through the half of the double four way valve 40.

The calibration peak obtained in accordance with the practice of my invention very closely resembles the shape and size of the adsorption and desorption peaks obtained for the sample whereas, in apparatus which is presently available for surface area measurements the calibration peak is sharp and irregular. I believe that the improvements realized in the precision of the measurements obtained in accordance with my invention are primarily due to the fact that my calibration peak is much more significant and accurate and, thus, the surface areas calculated therefrom are more precise. Also, the manner of obtaining the calibration peak in accordance with my invention permits one to rapidly detect any leaks in the system which would greatly impair the precision of the measurements obtained. In general such leaks usually occur at the points where the removable sample tube is attached to the system. For example, the calibration peaks obtained in my measurements will usually resemble each other very closely in size and shape and any slight variations should only be a function of minor changes in temperature and flow. Thus, if significant deviations are obtained in any given calibration peak obtained for a given volume of adsorbate injected, the deviation will indicate leakage and the measurment can be immediately repeated after eliminating the leak. Accordingly, surface area measurements obtained in accordance with my invention especially those based on single point determinations, are more reliable and more consistently reproducible and overall efficiency of the method of Nelsen and Eggertsen —especially in quality control applications—is greatly increased.

FIGURE 2 describes an arrangement of apparatus by which the efficiency of surface area measurements may also be further increased. Referring now to FIGURE 2, a gas mixture of diluent and adsorbate (or the diluent alone, e.g. helium) is introduced to line 100 through a flow control device as described in FIGURE 1 and consisting of pressure controller 10 and adjustable setting valve 12. The mixture of diluent is continually dried by passing it through a glass wool packed U-tube 102 which is immersed in liquid nitrogen 104. The mixture (or diluent alone) then passes into line 106 which directs the stream to half of a double four way valve 56 where the stream is directed through line 108 to the sample tube 110. While the mixture passes through sample tube 110, the sample is heated to about 400° F. to expel any volatiles which may be adsorbed on the surface thereof. These volatiles unless removed will greatly interfere with any surface area, measurements obtained subsequently. Accordingly, the volatiles expelled are continually swept from the same tube via line 112. Line 112 directs the stream to half of a double four way valve 64 where line 112 communicates with line 114 which conveys the stream to the atmosphere via vent 116.

The gas mixture (or diluent stream) is continually swept through sample tube 110 for about 8 minutes. Generally 8 minutes is required to devolatilize a sample, but somewhat longer times may be required when samples having higher amounts of volatiles are involved. It is to be understood that while the sample in tube 110 is being degassed, another sample located in tube 60 is being subjected to the adsorption and desorption steps involved in determining surface area by this technique, using a gas mixture supplied through line 58 as described in connection with FIGURE 1 previously herein.

When the measurement of the surface area of the sample located in tube 60 is complete, the half of double four way valve 56 is operated so that line 54 will communicate with line 108 while the stream in line 106 is directed to line 58 so that a new sample just introduced into tube 60 may be degassed while the area of the sample in tube 110 is being measured. Also, half of double four way valve 64 is operated so that line 112 will communicate with line 66 leading to the test cell 70 and line 62 now communicates with line 114, leading to the vent 116. It will be obvious that in accordance with this aspect of my invention, considerable time may be saved and the overall efficiency of the surface area measurement method is substantially increased.

The following examples are offered that those skilled in the art may better understand and practice my invention.

It is to be understood that these examples are illustrative in nature and in no way are they to be construed so as to limit my invention beyond those limits expressly set forth in the present specification or in the appended claims. The gaseous mixture used in all of the examples contained 9.8% nitrogen as adsorbate with the remainder being helium.

EXAMPLE 1

The following data were obtained on a Sorptometer which is a commercial apparatus presently available for determining the surface area of solids in accordance with the method of Nelsen and Eggertsen. In the apparatus utilized in this series of measurements of the surface area of various samples of two carbon blacks by a single operator, the calibration loop was located after the sample tube and just before the detector cell.

*Table I*

| Sample | Vulcan 3[1] Area (m.²/gram) | Vulcan 9[2] Area (m.²/gram) |
|---|---|---|
| 1 | 69.0 | 109.7 |
| 2 | 69.0 | 108.6 |
| 3 | 69.6 | 111.1 |
| 4 | 69.6 | 109.3 |
| 5 | 69.5 | 109.4 |
| 6 | 71.0 | 119.6 |
| 7 | 68.8 | 113.2 |
| 8 | 69.5 | 108.6 |
| 9 | 66.6 | 107.0 |
| 10 | 67.5 | 107.3 |
| 11 | 69.0 | 107.3 |
| 12 | 67.6 | 109.9 |
| 13 | 66.5 | 109.3 |
| Average | 68.7 | 110.0 |
| Standard Deviation ($\alpha$) | ±1.21 | ±3.29 |
| Percent Standard Deviation | 1.76 | 2.99 |

[1] A furnace carbon black produced by Cabot Corporation.
[2] A furnace carbon black produced by Cabot Corporation.

EXAMPLE 2

The following data for various samples of the same blacks of Example 1 were obtained using surface measurement apparatus which is arranged substantially as set forth in FIGURE 1.

TABLE II

| | Vulcan 3 Surface Area (m.²/gram) | Vulcan 9 Surface Area (m.²/gram) |
|---|---|---|
| | 67.8 | 119.9 |
| | 67.0 | 119.5 |
| | 66.6 | 120.2 |
| | 67.2 | 120.3 |
| | 67.4 | 120.7 |
| | 66.8 | 119.4 |
| | 67.0 | 120.3 |
| | 66.4 | 119.9 |
| | 66.8 | 120.2 |
| | 66.1 | 120.5 |
| | 66.7 | 120.3 |
| | 67.2 | 118.4 |
| Average | 66.9 | 120.0 |
| Standard Deviation ($\alpha$) | ±0.4 | ±0.6 |
| Percent Standard Deviation | ±0.6 | ±0.5 |

EXAMPLE 3

The surface areas of various carbon blacks produced by Cabot Corporation were measured in accordance with my method utilizing apparatus substantially similar to that set forth in FIGURE 1. The surface area obtained which was based on a single point determination was compared to the surface area obtained by the standard volumetric B.E.T. method. The data presented below includes surface areas calculated from the B.E.T. equation both with and without the use of the intercept. The intercept for any given material may be obtained by making measurements at two or more relative pressures and plotting the data to determine the intercept. In quality control work the intercept is usually assumed to be zero since the prime interest is in the relative quality of materials produced. The following data were obtained:

*Table III.—Comparison of single point surface area determinations with standard B.E.T. volumetric results*

| Sample | Surface Area Single Point (m.²/gram) | Surface Area Single Point Using Intercept (m.²/gram) | Intercept | Volumetric B.E.T. Surface Area (m.²/gram) |
|---|---|---|---|---|
| Graphon | 81.2 | 88.5 | 0.0005 | 89.4 |
| Vulcan 9 | 119.5 | 125.1 | 0.0002 | 124.1 |
| Regal 600 | 78.3 | 83.5 | 0.0004 | 83.9 |
| Spheron 6 | 106.2 | 110.1 | 0.0002 | 113.6 |
| Monarch 74 | 356.0 | 348.2 | −0.0002 | 346 |
| Vulcan 3 | 67.0 | 71.7 | 0.00035 | 71.5 |

EXAMPLE 4

Apparatus substantially similar to that set forth in FIGURE 1 was used to determine the surface area of the materials listed below. The following data were obtained:

*Table IV.—Comparison of single point surface area determinations with standard B.E.T. volumetric results with results then corrected for the intercept*

| Sample | Surface Area Single Point (m.²/gram) | Surface Area Single Point Using Intercept (m.²/gram) | Intercept | Volumetric B.E.T. Surface Area (m.²/gram) |
|---|---|---|---|---|
| Cab-O-Sil[1] H5 | 310.6 | 330.8 | .0001 | 330 |
| $TiO_2$ | 10.70 | 10.60 | −.001 | 10.3 |
| $Fe_3O_4$ | 6.63 | 6.63 | .000 | 6.67 |

[1] A finely divided pyrogenic silica produced by Cabot Corporation.

Many modifications of the details utilized to illustrate my invention may be substituted therefor without departing from the spirit and scope thereof. For example, the various inert diluents such as helium, hydrogen and mixtures thereof, and the various adsorbates such as hydrocarbons, nitrogen and mixtures thereof, together with the various methods of measuring the various concentrations of these ingredients in the mixture all of which are disclosed in more detail in U.S. Patent 2,960,870 are included within the scope of the present invention.

Having described my invention together with preferred embodiments thereof, what I declare as new and desire to secure by U.S. Letters Patent is as follows:

1. In the method for determining the surface area of a solid material wherein a gaseous mixture having a known composition of an adsorbate and an inert gaseous diluent is continually contacted at a substantially constant pressure on a once through basis with a known amount of said solid material and the concentration of adsorbate in said mixture is measured downstream of said material while said material is maintained first at a temperature at which neither the adsorbate nor the diluent is adsorbed by the material to any appreciable extent until said downstream measurement of said mixture indicates the concentration of adsorbate to be constant, then the material is cooled to a temperature at which the adsorbate is selectively adsorbed by said material until said downstream measurement of said mixture again indicates that the concentration of the adsorbate has returned to the original constant value and then the material is subjected to an expelling step wherein it is heated to a temperature at which neither the adsorbate nor the diluent is adsorbed by the material to any appreciable extent until the adsorbed adsorbate is expelled therefrom, the improvement which comprises determining the volume of adsorbate adsorbed and released by the said material by continually recording said downstream measurements during the time the adsorbate is being expelled in said expelling step, introducing a separate known incremental amount of said adsorbate to said mixture at a point upstream of said material and again continually recording said downstream measurements until concentration of the adsorbate has again returned to the original constant value and thereby providing two records which can be utilized in a convenient and accurate determination of particle size.

2. The method of claim 1 in which the measurements are achieved by sensing and recording the difference in thermal conductivities of each said gas mixture passed through the material being tested and thereby providing two records which can be utilized in a convenient and accurate determination of particle size.

3. The method of claim 1 in which the said adsorbate is a substance chosen from the group consisting of hydrocarbons, nitrogen and mixtures thereof.

4. The method of claim 1 in which the said diluent is a substance chosen from the group consisting of helium, hydrogen and mixtures thereof.

5. The method of claim 1 in which the said inert diluent is helium and the said adsorbate is nitrogen.

6. In apparatus for determining the surface area of a solid comprising in combination and connected by suitable tubing in the order named, means for supplying a constant known flow of a mixture of a gaseous adsorbate and a gaseous inert diluent to a sample chamber for said solid, means to measure the concentration of at least one of the ingredients in said mixture, and means to bring said sample chamber to two constant, known, widely spaced temperatures, the improvement which comprises means to introduce into the apparatus at a position immediately before the position of said solid being tested a separate additional known volume of said adsorbate.

7. In apparatus for determining the surface area of a solid comprising in combination, means for supplying a constant known flow of a gaseous mixture of an adsorbate and an inert diluent at a substantially constant pressure to a line suitably connected to convey said mixture, in the order named, to a first thermal conductivity cell to measure the conductivity of said mixture, a removable sample tube, a second thermal conductivity cell to measure the conductivity of said mixture after same has passed through said tube, a recording potentiometer electrically connected to a voltage source and said conductivity cells to record differences in the current flow between the two cells, and means for bringing the sample tube to two constant known widely spaced temperatures, the improvement which comprises at least one loop of known volume located prior to said sample tube, means to selectively isolate said loop of known volume from said line, means to fill said loop of known volume with substantially pure adsorbate, and means to introduce substantially all of the adsorbate in said loop of known volume to said sample tube.

8. The apparatus of claim 7 wherein the said means to supply said constant known flow comprises a differential pressure regulator in combination with a variable valve.

9. The apparatus of claim 7 further characterized by a second removable sample tube, means to connect alternatively said tubes at one end to said line conveying said mixture, means to connect alternatively the opposite ends of said tubes to said second conductivity cell, means to connect alternatively the first mentioned ends of said tubes to a line conveying a purge gas and means to connect alternatively said opposite ends of said tubes to an exhaust means.

10. The apparatus of claim 9 wherein the said means to connect one end of said tubes to said line conveying said mixture is coordinated so that when said end is connected to said mixture line, the opposite end of said tube is connected to said means to connect said opposite end to said second conductivity cell and the means to connect one end of said tubes to said line conveying said purge gas is coordinated so that when said end is connected to said purge line the opposite end of said tube is connected to said exhaust means.

11. The apparatus of claim 9 wherein said means to connect one of said ends of said tubes to said line conveying said mixture consists of valve means which can interchangeably connect one of said ends of said tubes to said mixture line while simultaneously connecting one of said ends of the other tube to said purge gas source and said means for connecting said second end of said tubes to said second conductivity cell consists of valve means which can interchangeably connect the second end of the said tube connected to said mixture line to said second conductivity cell while simultaneously connecting the second end of the other tube to said means to said exhaust means.

References Cited by the Examiner

UNITED STATES PATENTS 2,729,969 1/56 Innes.
2,960,870 11/60 Nelsen et al. _____ 73—432

OTHER REFERENCES

Daeschner et al.: Anal. Chem., vol. 34, August 1962, pages 1150–55.

Cahen et al.: Anal. Chem., vol. 35, February 1963, pages 259–60.

LOUIS R. PRINCE, *Primary Examiner.*

DAVID SCHONBERG, *Examiner.*